May 3, 1955 J. E. EUTH 2,707,631
FEED DEVICE FOR A REGISTER
Filed March 16, 1954 4 Sheets-Sheet 2
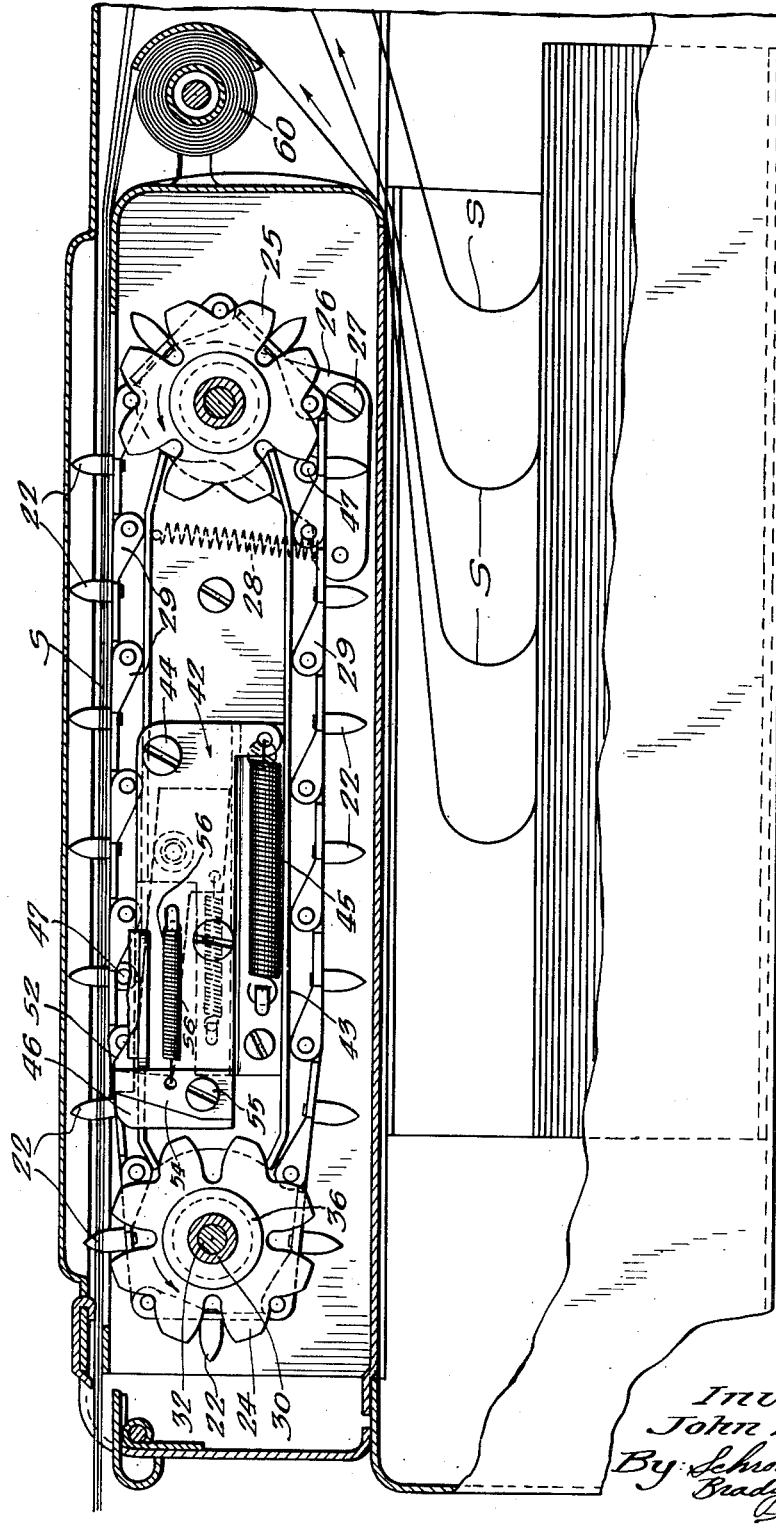
Inventor:
John E Euth
By Schroeder, Hofgren,
Brady & Wegner
Attorneys May 3, 1955  J. E. EUTH  2,707,631
FEED DEVICE FOR A REGISTER
Filed March 16, 1954  4 Sheets-Sheet 4
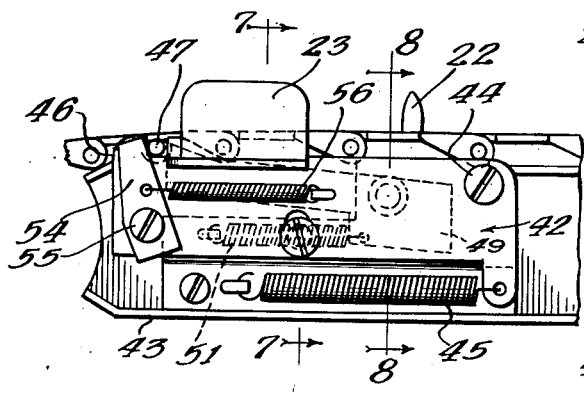
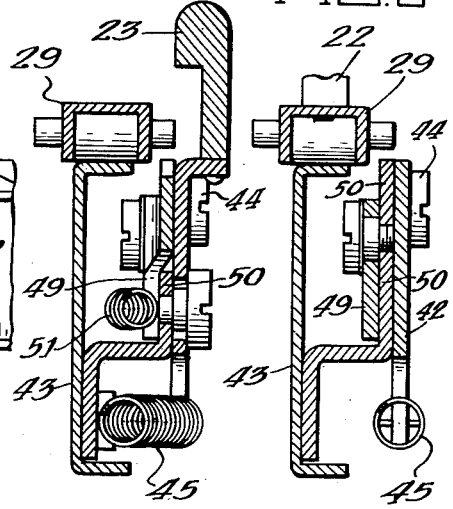
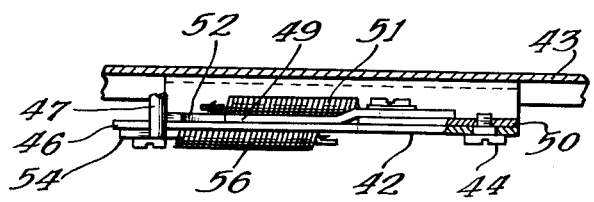
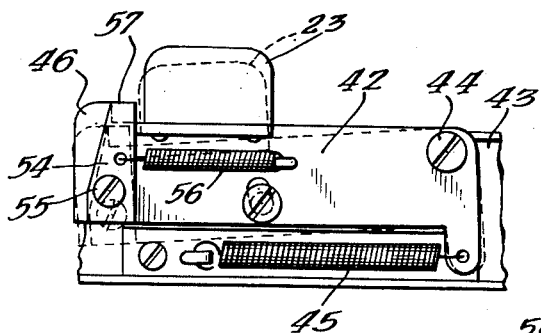
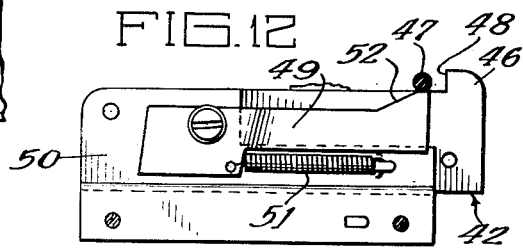
Inventor:
John E. Euth
By: Schroeder, Hofgren,
Brady & Wegner
Attorneys

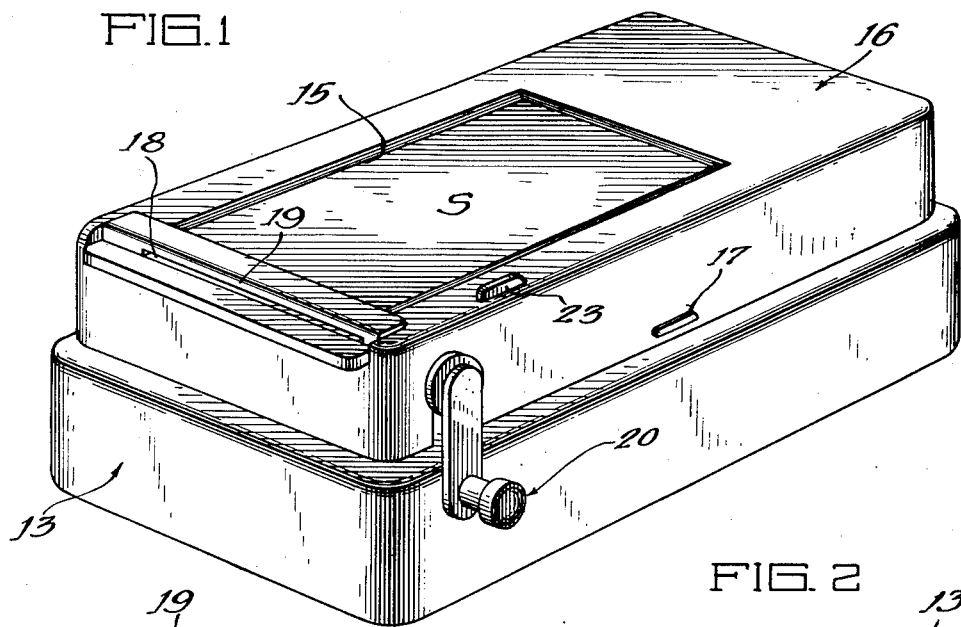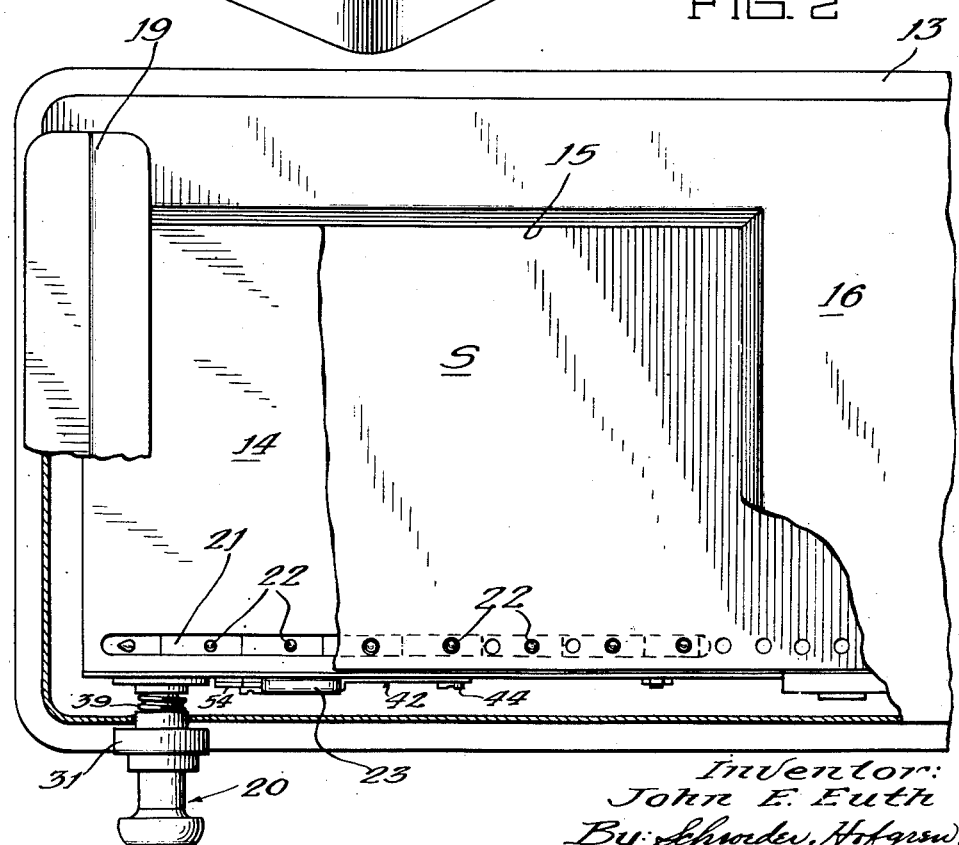

United States Patent Office 2,707,631
Patented May 3, 1955

2,707,631

FEED DEVICE FOR A REGISTER

John E. Euth, Chicago, Ill., assignor to Uarco, Incorporated, a corporation of Illinois Application March 16, 1954, Serial No. 416,563

9 Claims. (Cl. 271—2.1)

This invention relates to a writing machine and more particularly to a feeding device for an autographic register.

Autographic registers are in use in great numbers, particularly in retail stores, for the making out of sales slips and like forms. The stationery used in these registers is of the continuous form type with perforations across the stationery between the forms so that they may be easily severed into form length. Usually a crank is provided on the register so that the operator may simply turn the crank to forward the forms, which have been filled in, out of the register.

A problem has existed in ejecting only a form length as well as maintaining the forms in proper registration. Ordinarily, the length of form ejected from a register has been determined by a positive stop provided on the crank itself.

In the present invention, the manually turned crank has no positive stop. It can be turned beyond the position which would eject a form length or may be turned in reverse direction without affecting either the registration of the forms or the ejecting of a form length. A stop mechanism is provided on the feeding device operable independently of the crank. After a form length has been ejected from the register, the stop renders the crank inoperative. The simple expedient of depressing a button will thereafter render the crank operative again so that a succeeding form length will be ejected from the register. These improvements have obviated the difficulties found in preceding structures.

It is, therefore, the principal object of this invention to provide an autographic register with a new and improved feeding device.

A further object is to provide a register with a crank which is rendered inoperative after feeding a form length of stationery from the register.

Another object is the provision of an improved stop means associated with a feeding device in a register to hold the stationery against advance and release the stationery for advance at predetermined times.

Further objects, features and advantages of the present invention will be apparent from the following description of a preferred embodiment illustrated in the accompanying drawings in which:

Figure 1 is a perspective view of a register embodying the invention;

Figure 2 is a fragmentary top plan view, partly in section and partly broken away, showing a portion of the feeding device in the associated structure;

Figure 3 is an enlarged fragmentary vertical sectional view through the register looking toward the feeding device;

Figure 6 is a fragmentary side elevational view of the stop mechanism with surrounding parts of the register removed for sake of clarity;

Figure 7 is a vertical sectional view through the stop mechanism substantially along line 7—7 in Figure 6;

Figure 8 is a view similar to Figure 7 taken substantially along line 8—8 in Figure 6;

Figure 9 is a fragmentary top plan view of the stop mechanism with parts of the surrounding register removed for sake of clarity;

Figure 10 is a fragmentary side elevational view similar to Figure 6 showing a position of the mecahnism in dotted outline;

Figure 11 is a elevational view of the reverse stop dog looking outwardly at the dog from inside the register; and Figure 12 is similar to Figure 11 showing the dog in operative position for locking the feeding device against reverse movement.

Figure 4:
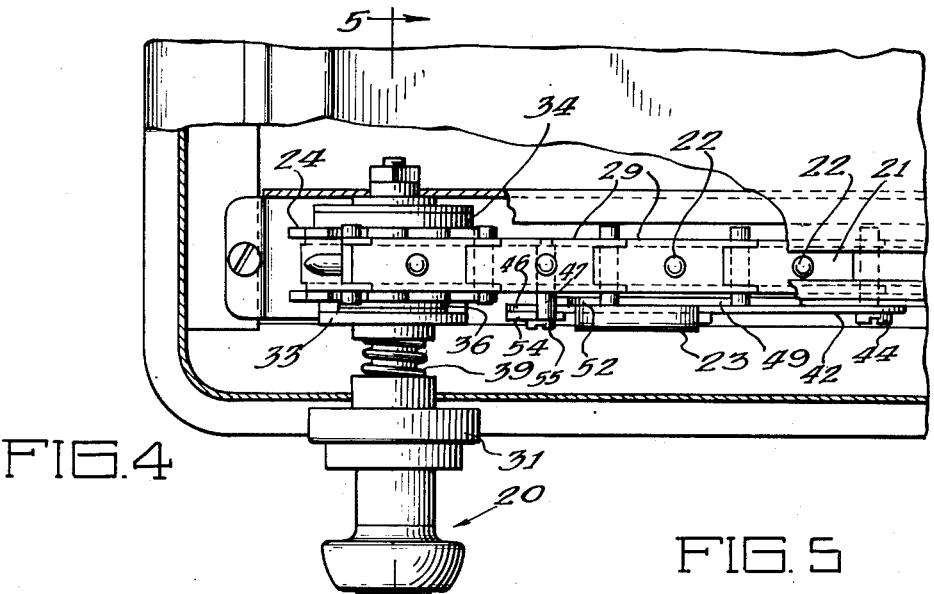
Figure 4 is an enlarged fragmentary horizontal view, partly in section through the crank and associated forwarding device.
Figure 5:
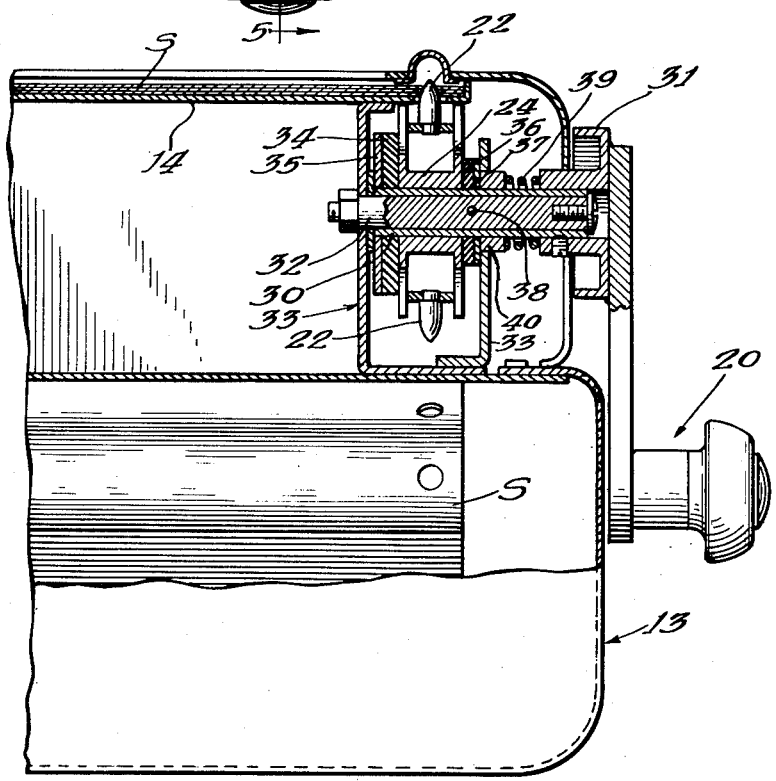
Figure 5 is a vertical sectional view through a crank mechanism taken substantially along line 5—5 in Figure 4.

The register chosen for purposes of illustration of the invention includes a base 13 in which a supply of stationery is placed for passing over a platen 14 comprising a plate held adjacent an opening 15 in a cover member 16 mounted on the base. The cover member is hinged along the invisible side in Figure 1 so that it may be swung upwardly relative to the base upon the release of a catch member 17. The stationery S appears in the opening in the cover and after appropriate entries have been made on the form, it may be ejected from the register through an opening 18 under a tear-off edge 19. The forms are ejected by manually turning a crank handle 20 which has a drive connection with a feeding mechanism for advancing the stationery through the register.

In Figure 2, it will be noted that the feeding device comprises a chain 21 having a plurality of upwardly extending pins 22 which enter a perforated feed band on one side of the stationery. The chain 21 is of the caterpillar type having links joined by pins so that it is continuous in form.

A manually depressible button 23 is provided adjacent the crank and extends upwardly through the cover 16. After a form length of stationery has been ejected from the register, the crank 20 may be turned either forwardly or backwardly without moving the stationery. When it is desired to again eject the stationery from the register, the button 23 may be depressed slightly to render the handle 20 operative again. The particular structure by which this function is achieved will be described in detail.

The mechanism whereby the crank handle 20 may be rendered operative and inoperative comprises a friction drive with the chain 21 permitting the handle to be turned without moving the chain.

The particular structure of the chain includes a forward sprocket 24 and a rear sprocket 25 which are mounted upon a plate 26 pivoted at 27 and biased by spring 28 away from the sprocket 24. This pivotal mounting of sprocket 25 permits variation in the distance between the axes of the sprockets to accommodate the passing of links 29 about the sprockets. The front sprocket 24 is mounted idly upon a sleeve 30 which is secured to the shank 31 of the handle 20. A shaft 32 is mounted inside the sleeve and serves to support the mechanism in the framework 33 extending upwardly from the base 13 of the register. A friction washer 34 is positioned against the inside of the sprocket 24 and held in place by a backing washer 35 in turn secured to the sleeve. A similar friction washer 36 provided with a backing washer 37 is also secured by a pin 38 for rotation with the sleeve. This friction washer is capable of limited movement longitudinally of the sleeve and is held against the outside of the sprocket 24 by a compression spring 39 bearing against the handle and a sleeve 40 abutting the outside of the backing washer 37. In this manner, the sprocket 24 is, in effect, clamped between the friction washers 34 and 36 but may move independently of the washers upon slippage between the sides of the sprocket and friction material. This structure permits the handle 20 to be turned without moving the pin feed when the chain is held against movement.

The stop mechanism operates entirely on the chain feed and is independent of the handle 20 in that it does not stop the movement of the handle. The structure of the stop mechanism is best illustrated in Figure 3 and Figures 6 through 12. The chain supporting the register pins 22 is connected by pins. Some of the pins extend outwardly from the chain a sufficient distance to engage the stop mechanism while others of the pins may pass the stop mechanism without engaging the parts. In this manner, the length of stationery which will be fed from the register upon turning the crank and feeding mechanism may be gauged by appropriate choice of the particular pins which are to engage the stop mechanism.

The stop mechanism includes a stop member 42 which is pivoted to the frame 43 of the chain feed by a screw 44. A tension spring 45 is connected to the frame and to the stop member urging it in an upward direction. The outer end 46 of the stop member is formed in the shape of a hook in order to catch the pin 47 which extends outwardly beyond the other pins on the chain to obtain a 8½ inch travel of the chain between engagements of the pins and stop mechanism. This provides for a 8½ inch form length to be ejected from the register. As best illustrated in Figure 6, a pin 47 has come in contact with the surface 48 of the hook portion 46 of the stop member. Further advance of the chain toward the left or in forward direction is thus arrested. Reverse movement of the chain is also arrested when the pin 47 engages the surface 48. A stop dog 49 is pivoted to a bracket 50 also supporting the stop member 42 but on the inside of the bracket. This stop dog is urged upwardly by a tension spring 51 so that the cam surface 52 is in the path of the pin 47. As the pin rides over the cam surface 52, the dog is depressed and permits the passage of the pin. Once the pin is past the dog, it is snapped upwardly by the spring 51 so that the outer surface 53 then reposes behind the pin 47 and prevents any reverse movement of the chain. As illustrated in Figure 11, the pin 47 is caught between the hook portion of the stop member and the surface 53 of the reverse stop dog.

In the operation of a register, the forms are ejected following the filling in of certain data on the form. The stop mechanism described above will operate to stop the chain feed from further movement even though the handle 20 may be turned either forwardly or reversely after such stopping. After filling in a form, it may be desired to eject these forms so that the handle 20 must be rendered operative to move the feed pins to eject the stationery. This is accomplished by the depressing of the finger member 23, which is secured to the body of the stop member 42.

The particular structure which permits the handle to become operative includes a hook closing dog 54 pivotally mounted on the stop member by screw 55 and urged toward the pivoted end of the stop member by a tension spring 56. When the stop member is depressed, the upper edge 57 of the dog 54 is moved rearwardly under the pin 47 and serves to hold the stop member in its lower position. The upper edge 57 of the dog 54 is aligned with the top of the hook portion 46 so that the pin can then ride out of the hook. After the pin 47 is past the hook portion 46, spring 45 operates to return the mechanism to its upward position as illustrated in the full lines in Figure 10. The stop mechanism is thus ready to receive the next pin 47 which enters the hook portion 46 of the stop member. In so doing, the dog 54 is moved against the action of its spring 56 to permit the pin 47 to again engage the surface 48 of the stop member.

It will be noted that the mechanism described permits the stationery to be advanced in the register a predetermined distance and that a manual operation is required to render the handle 20 operative to eject the sheet of forms. The handle 20 can thus be turned to any position desired without affecting the feeding since the control is independent of the handle.

A carbon roll 60 is illustrated in Figure 3 and is mounted in a holder about which the stationery passes. The particular carbon holder is shown and illustrated in my copending application, Ser. No. 416,564 filed March 16, 1954, and does not form a part of this invention.

The foregoing detailed description has been given for clearness of understanding only, and no unnecessary limitations should be understood therefrom, for some modifications will be obvious to those skilled in the art.

I claim:

1. In an autographic register having a chain pin-type feeding device for advancing stationery across a platen, a stop mechanism permitting advance of the feeding device in predetermined increments, comprising: a pivoted stop member having a hook portion; means yieldably holding the hook portion in a position beside a run of the chain, a pin on the chain extending outwardly therefrom to engage said hook portion and thereby stop forward advance of the chain; a hook closing dog mounted on the stop member and biased to move over the hook and under the pin upon manual movement of the stop member away from the pin permitting advance of the chain a predetermined distance again to engage the pin and hook portion.

2. A device as specified in claim 1 wherein a manually operable crank is provided with a yieldable frictional drive connection with said feeding device permitting turning of the crank after the chain has been stopped.

3. A device as specified in claim 1 wherein a pivotally mounted reverse stop dog is also positioned in the path of said pin, said dog having a cam surface permitting passage of the pin past the dog only in forward direction.

4. A device as specified in claim 1 wherein said chain is provided with a plurality of said outwardly extending pins positioned apart on the chain a distance to permit advance of a form length of stationery with advance of the chain between said pins.

5. In an autographic register having a chain pin-type feeding device for advancing stationery across a platen, a stop mechanism permitting advance of the feeding device in predetermined increments, comprising: a pivoted stop member having a hook portion biased to a position beside the chain; a pin on the chain extending outwardly to engage said hook stopping further advance of the chain; means on the stop member for manually moving the hook portion out of the path of the pin; a pivoted dog engageable with the pin upon said manual movement of the stop member to hold the hook portion out of the path of the pin during initial advance of the chain, said hook portion being returned to said position beside the chain after said initial forward advance of the chain for again stopping the feeding device.

6. In an autographic register having a chain pin-type feeding device for advancing stationery across a platen, a stop mechanism permitting advance of the stationery in predetermined increments, comprising: a pivoted stop member having a hook portion movable into and out of a position beside a run of the chain; spring means biasing the hook portion into said position; a pin on the chain extending outwardly and moving in a path to engage said hook portion and thereby stop further advance of the chain; a reverse stop dog pivotally mounted on the stop member also in the path of said pin, said dog being yieldably biased into said path and having a cam surface permitting the pin to ride past the dog only in forward direction, said hook portion and reverse stop dog releasably holding the feeding device against forward and reverse movement; a finger portion on the stop member for manual movement of said member out of the path of the pin; and a holding dog riding the pin out of said hook portion upon said manual movement of the stop member permitting sequential advancements of the feeding device in increments equal to the distance of travel of said pin between engagements with said hook portion.

7. In an autographic register having a pin-type feeding device for advancing stationery across a platen, a manually operable feed mechanism comprising: a crank rotatably mounted in the register; a friction plate secured for turning with the crank; means yieldably urging the friction plate into driving relation with the feeding device; a pair of cooperating dogs adapted to lock the feeding device against both forward and reverse movement after a predetermined distance of travel, said yieldable driving relation permitting rotation of the crank after the feeding device has been stopped; and a manually operable member for moving one of the dogs out of locking position to permit advance of the feeding device.

8. In an autographic register having a chain pin-type feeding device for advancing stationery across a platen, a manually operable feed mechanism comprising: a drive sprocket for the chain and a shaft idly mounting the sprocket, the chain feeding device having a plurality of pin connected links with a selected pin extending outwardly from the chain farther than other pins; a crank rotatably mounted in the register and secured to said shaft; a friction plate secured to said shaft for turning with the crank; spring means yieldably urging the friction plate against the sprocket for driving the feeding device upon turning the crank, shaft and friction plate; and stop means for engaging said selected outwardly extending pin to stop movement of the feeding device after a predetermined distance of travel, said spring means yielding and permitting rotation of the crank after the feeding device has been stopped.

9. A device as specified in claim 8, wherein the stop means comprises cooperating members including a stop member having a hook in the path of the selected pin and a pivoted dog having a cam portion engageable with said pin to depress the dog permitting passage of the pin thereover and an adjacent outer face movable to a position behind the pin preventing reverse rotation of the chain.

References Cited in the file of this patent
UNITED STATES PATENTS

| | | |
|---|---|---|
| 1,247,891 | Stern | Nov. 27, 1917 |
| 1,437,949 | Sherman et al. | Dec. 5, 1922 |